2,837,466

REMOVING BENZENE AND THIOPHENE FROM GASOLINE HYDROCARBONS

Constantijn Leopold van Panthaleon Baron van Eck, Amsterdam, Netherlands, assignor to Shell Development Company, Emeryville, Calif., a corporation of Delaware No Drawing. Application February 2, 1953
Serial No. 334,715

Claims priority, application Netherlands July 31, 1952

8 Claims. (Cl. 196—30)

This invention relates to a method for removing benzene and/or thiophene from mixtures thereof with hydrocarbons boiling in the gasoline boiling range.

It is well known that benzene and thiophene, when brought in contact with an aqueous ammoniacal nickel cyanide solution, will form solid complexes with the nickel cyanide and ammonia. It has been suggested that a clathrate type of molecular compound is formed by the imprisonment of the benzene or thiophene molecule in some kind of cage structure of the ammonia-nickel cyanide complex as it crystallizes. Accordingly, it has been proposed to remove benzene and/or thiophene from a hydrocarbon mixture by contacting the mixture with an aqueous ammoniacal nickel cyanide solution, whereby a solid complex or compound is formed, and removing the solid complex from the hydrocarbon mixture. It was found, however, that only a relatively small portion of the benzene and/or thiophene present could be removed. The poor results obtained have been attributed to the fact that, by shaking the aqueous ammoniacal nickel cyanide solution with the hydrocarbon mixture, the hydrocarbon mixture is divided into fine droplets which are immediately covered with a film of the solid complex. This film forms a fibrous, stable emulsion in which the solid interface prevents the interchange of the liquid phases. The process has, therefore, been abandoned as being not feasible.

It is, therefore, a principal object of the present invention to provide an improved process for the removal of compounds of the class consisting of benzene and thiophene from hydrocarbons boiling in the gasoline boiling range, utilizing benzene- and thiophene-ammonia-nickel cyanide solid complex formation. Other objects and advantages will become apparent from the following detailed description.

According to the present invention, it has now been found that benzene and thiophene can be removed from a hydrocarbon mixture boiling in the gasoline boiling range by a process comprising contacting the hydrocarbon mixture with a suspension of solid nickel cyanide in an aqueous ammonia solution, whereby solid complexes of ammonia, nickel cyanide and benzene and/or thiophene are formed, and removing the solid complexes from the hydrocarbon mixture.

Described in greater detail, the process of the present invention comprises contacting a hydrocarbon mixture boiling in the gasoline boiling range and containing minor amounts of benzene and/or thiophene with a suspension of solid nickelous cyanide, $Ni(CN)_2$, in an aqueous ammonia solution containing at least about 2.5% by weight of ammonia, the suspension containing at least about 2–3% by weight of solid nickelous cyanide, at about ambient room temperature, that is, a temperature of the order of from about 20° C. to about 40° C., whereby a solid complex of benzene and/or thiophene, ammonia and nickel cyanide is formed, and separating the substantially benzene and/or thiophene-free hydrocarbon mixture from the aqueous phase which contains the solid complex.

The concentration of the ammonia in the ammonia solution employed is preferably at least 4% by weight, and particularly between about 5 and about 10% by weight. With ammonia solutions containing less than about 4% by weight ammonia, difficultly separable emulsions are formed during contact with the hydrocarbon mixture. However, ammonia concentrations of as low as 2.5% by weight can be tolerated if a minor amount of a demulsifying agent, such as sodium chloride or Turkey red oil, is present. The maximum permissible ammonia concentraiton (based on the aqueous ammonia solution) during the formation of the complexes, is about 10% by weight. The most favorable ammonia concentration is dependent on the composition of the original mixture, the amount of nickel cyanide present, and the temperature of the process.

The suspension of nickel cyanide in aqueous ammonia contains a substantial amount, preferably at least 2–3% by weight, of solid nickel cyanide. The aqueous ammonia solution of the suspension is, of course, saturated with respect to nickel cyanide at the temperature of operation. The maximum amount of solid nickel cyanide present in the suspension is technologically limited by the pumpability of the suspension. Generally, it is preferred to employ a suspension containing not more than about 20% by weight of solid nickel cyanide.

The quantity of the suspension employed depends upon the concentration of the cyclic compound (benzene and/or thiophene) in the hydrocarbon mixture to be treated, as well as the concentration of nickel cyanide in the suspension. Preferably, an amount of suspension is employed such that the weight ratio of the nickel cyanide therein to the cyclic compound in the hydrocarbon mixture is at least 1.5:1, and more particularly, at least 3:1.

The benzene and/or the thiophene can be released from the resulting complex either while the complex is still in the aqueous phase or after it has been removed therefrom. It is more advantageous to decompose the complex in the presence of the aqueous phase since fewer steps are involved. One method of decomposing the complex comprises adding ammonia thereto (if the complex is removed from the aqueous phase before the decomposition step, an aqueous ammoniacal solution should be added). In the presence of the excess ammonia, the complex decomposes, and the benzene and/or thiophene is released. The concentration of ammonia necessary to decompose the complex depends, inter alia, on the initial mixture being treated. Generally, ammonia concentrations of at least 10–12% by weight (on an ammonia-water basis) are necessary. Higher concentrations up to saturation can be used. Generally, the heat released when the ammonia is dissolved is sufficient to cause the benzene or thiophene to distil off. If not, the benzene or thiophene released forms a separate liquid phase, which can readily be separated from the aqueous phase. In some cases, a portion of the benzene is recovered in the vapor phase, and the remaining portion is recovered in the liquid phase.

Another method for decomposing the complexes formed in the process of the present invention involves heating the complexes, together with at least a part of the aqueous phase, under pressure, for example, heating the complexes to a temperature of at least about 75° C. under a pressure of at least about 3–4 atmospheres absolute, without allowing appreciable amounts of ammonia to escape. The complexes decompose and a mixture of benzene and minor amounts of ammonia and of water distil off. When the condensate is allowed to cool, two liquid phases are formed; an upper benzene phase and a lower aqueous phase. The lower phase can suitably be recycled to the zone in which the complexes are decomposed. In the foregoing operation, it is necessary to allow the pressure to rise during the heating step; otherwise, only ammonia distils off, and only minor amounts of benzene or thiophene are liberated.

The regenerated aqueous phase can be recycled for contact with further portions of the hydrocarbon mixture.

The following example is illustrative of the process of the present invention:

One hundred parts by weight of a gasoline fraction having a boiling temperature within the range of from about 60° to 100° C. and containing 7.7% by weight of benzene was contacted with 680 parts by weight of a suspension of nickelous cyanide in an aqueous ammonia solution. The suspension contained 4.6% by weight of nickel cyanide expressed as $Ni(CN)_2$, 6.0 parts by weight of ammonia ($NH_3$) and 89.4% by weight of water. The temperature of the aqueous phase was 35° C. The mixture was permitted to settle for 15 minutes to form a gasoline phase and an aqueous phase containing the resulting benzene-ammonia-nickel cyanide solid complex. The resulting phases were then separated. Traces of ammonia were removed from the resulting gasoline phase by heating to about 70° C. under reflux.

The resulting aqueous phase containing the solid complex was heated to 100° C. under a pressure of 3.7 atmospheres absolute during which the benzene contained in the complex, together with small amounts of water and of ammonia distilled off. The distillate was condensed to yield an upper benzene phase and a lower aqueous phase, which phases were then separated. Traces of ammonia remaining in the benzene phase were removed by distillation. The lower aqueous phase was recycled to the decomposition step.

Alternatively, the benzene-ammonia-nickel cyanide complex can be decomposed by pumping in additional ammonia. When the concentration of the ammonia in the present case is increased to about 12% by weight (the temperature thereby increases to about 66° C.), the complex decomposes and the benzene is liberated. In this instance, before the regenerated aqueous phase can be recycled for contact with further portions of benzene-containing gasoline, it must first be freed of the excess ammonia. This is suitably accomplished by distillation.

The yield of benzene amounted to about 71% based on the amount of benzene initially present in the gasoline. It has been found that the yield depends on the concentration of the benzene in the initial mixture. Under circumstances similar to those described above, using as initial material a gasoline derived, for example, from the platforming process, and containing about 30% by weight of benzene, a yield of about 90% can be obtained.

When the foregoing method is used to treat a gasoline fraction containing thiophene, for example, one containing about 5% thiophene, the thiophene can be removed to the extent of 50% or more.

In order to illustrate the advantages of the present invention, each of three different mixtures of benzene and dearomatized gasoline containing 10.6%, 3.6% and 1.1% by weight of benzene was treated respectively, with twice its weight of an aqueous ammoniacal nickel cyanide solution, generally known as Hoffmann solution. The yield of benzene obtained was 38.7%, 50.0%, and 0.0%, respectively, being considerably less than the separation effected by utilizing the suspension of solid nickelous cyanide in aqueous ammoniacal solution in accordance with the present invention.

I claim as my invention:

1. A method for removing benzene from a mixture thereof with hydrocarbons boiling within the gasoline boiling range which comprises contacting said mixture with a suspension of solid nickel cyanide in an aqueous ammonia solution containing from 5% to 10% by weight of ammonia, said suspension containing from 2% to 20% by weight of solid nickel cyanide in excess of that required to saturate the aqueous ammonia solution, whereby a solid complex of benzene, nickel cyanide, and ammonia is formed; permitting the resulting mixture to settle whereby two phases stratify, a hydrocarbon phase and an aqueous phase containing said solid complex; and separating said hydrocarbon phase from said aqueous phase.

2. The method according to claim 1, wherein ammonia is added to the separated aqueous phase containing the solid complex in an amount such that the concentration of ammonia in the aqueous phase is at least 10% by weight, on an ammonia-water basis, sufficient to decompose the solid complex and whereby benzene is liberated from said solid complex.

3. The method according to claim 1, wherein the separated aqueous phase containing the solid complex is heated to a temperature of at least 75° C. under a pressure of at least 3 atmospheres, whereby benzene is liberated from said solid complex.

4. A method for removing thiophene from a mixture thereof with hydrocarbon boiling within the gasoline range which comprises contacting said mixture with a suspension of solid nickel cyanide in an aqueous ammonia solution containing from 5% to 10% by weight of ammonia, said suspension containing from 2% to 20% by weight of solid nickel cyanide in excess of that required to saturate the aqueous ammonia solution, whereby a solid complex of thiophene, nickel cyanide and ammonia is formed; permitting the resulting mixture to settle whereby two phases stratify, a hydrocarbon phase and an aqueous phase containing said solid complex; and separating said hydrocarbon phase from said aqueous phase.

5. A method for removing benzene and thiophene from a mixture thereof with hydrocarbons boiling within the gasoline boiling range which comprises contacting said mixture with a suspension of solid nickel cyanide in an aqueous ammonia solution containing not more than 10% by weight of ammonia, said suspension containing not more than 20% by weight of solid nickel cyanide but an amount in excess of that required to saturate the aqueous ammonia solution, whereby solid complexes of benzene, nickel cyanide and ammonia and of thiophene, nickel cyanide and ammonia are obtained; and separating said solid complexes from said hydrocarbons.

6. A method for removing a cyclic compound selected from the group consisting of benzene and thiophene from a mixture thereof with hydrocarbons boiling within the gasoline boiling range which comprises contacting said mixture with a suspension of solid nickel cyanide in an aqueous ammonia solution containing from 2.5% to 10% by weight of ammonia, said suspension containing from 2% to 20% by weight of solid nickel cyanide in excess of that required to saturate the aqueous ammonia solution, whereby a solid complex of said cyclic compound, nickel cyanide and ammonia is formed.

7. A method of recovering a cyclic compound selected from the group consisting of benzene and thiophene from a mixture thereof with hydrocarbons boiling within the gasoline boiling range which comprises contacting said mixture at a temperature of from about 20° C. to about 40° C. with a suspension of solid nickel cyanide in an aqueous solution containing from 5% to 10% by weight of ammonia, said suspension containing from 2% to 20% by weight of solid nickel cyanide in excess of that required to saturate the aqueous ammonia solution, whereby a solid complex of said cyclic compound, nickel cyanide, and ammonia is formed; separating the resulting mixture into a liquid hydrocarbon phase and an aqueous phase contianing said solid complex; recovering said cyclic compound from said solid complex by heating it in the presence of at least part of said aqueous phase to a temperature of at least 75° C. under a pressure of at least about 3 atmospheres, whereby said cyclic compound is liberated from said solid complex and a regenerated aqueous phase is formed; separating said cyclic compound from the regenerated aqueous phase; cooling the regenerated aqueous phase to a temperature of from about 20° C. to about 40° C.; and recycling the regenerated aqueous phase for contacting further portions of said hydrocarbon mixture.

8. A method of recovering a cyclic compound selected from the group consisting of benzene and thiophene from a mixture thereof with hydrocarbons boiling within the gasoline boiling range which comprises contacting said mixture at a temperature of from about 20° C. to about 40° C. with a suspension of solid cyanide in an aqueous solution containing from 5% to 10% by weight of ammonia, said suspension containing from 2% to 20% by weight of solid nickel cyanide in excess of that required to saturate the aqueous ammonia solution, whereby a solid complex of said cyclic compound, nickel cyanide, and ammonia is formed; separating the resulting mixture into a liquid hydrocarbon phase and an aqueous phase containing said solid complex; recovering said cyclic compound from said solid complex by adding excess ammonia to said separated aqueous phase in an amount such that the concentration of ammonia in the aqueous phase is at least about 12% by weight, on an ammonia-water basis, whereby said cyclic compound is liberated from said solid complex and a regenerated aqueous phase containing such excess ammonia is formed; separating said cyclic compound from the regenarated aqueous phase; removing said excess ammonia from the regenerated aqueous phase; and recycling the regenerated aqueous phase for contacting further portions of said hydrocarbon mixture.

References Cited in the file of this patent

UNITED STATES PATENTS

| 2,418,391 | Ayers | Apr. 1, 1947 |
| 2,732,413 | Jones et al. | Jan. 24, 1956 |

OTHER REFERENCES

Hal'pern: Bull Acad. Sci., USSR., Classe Sci. Math. Nat. ser. Chim. (1937), pages 435–41, also C. A. 31, page 7350 (1937).

Evans et al.: J. Chem. Soc. (1950), page 3346.

Evans et al.: J. Chem. Soc. (1950), pt. IV 3346.

Rayner et al.: J. Chem. Soc. (Feb. 1952), pages 319 to 328.